(12) United States Patent
Berdardi et al.

(10) Patent No.: US 8,102,865 B2
(45) Date of Patent: Jan. 24, 2012

(54) GROUP BASED ALLOCATION OF NETWORK BANDWIDTH

(75) Inventors: Ara Berdardi, Mercer Island, WA (US); Nelamangal Krishnaswamy Srinivas, Sammamish, WA (US); Ashwin Palekar, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 388 days.

(21) Appl. No.: 12/122,475

(22) Filed: May 16, 2008

(65) Prior Publication Data

US 2009/0287822 A1 Nov. 19, 2009

(51) Int. Cl.
H04L 12/28 (2006.01)
G06F 15/173 (2006.01)
(52) U.S. Cl. .................................. 370/401; 709/226
(58) Field of Classification Search .................. 370/401
See application file for complete search history.

(56) References Cited

U.S. PATENT DOCUMENTS

| | | | | |
|---|---|---|---|---|
| 5,757,771 | A * | 5/1998 | Li et al. | 370/235 |
| 5,991,812 | A * | 11/1999 | Srinivasan | 709/232 |
| 6,327,254 | B1 | 12/2001 | Chuah | |
| 6,385,168 | B1 | 5/2002 | Davis et al. | |
| 6,665,495 | B1 * | 12/2003 | Miles et al. | 398/54 |
| 6,791,949 | B1 * | 9/2004 | Ryu et al. | 370/254 |
| 6,894,973 | B1 | 5/2005 | Mishra | |
| 7,065,048 | B1 | 6/2006 | Levy et al. | |
| 7,106,757 | B2 * | 9/2006 | Hong et al. | 370/469 |
| 7,177,956 | B2 | 2/2007 | Mann et al. | |
| 7,500,014 | B1 * | 3/2009 | Jacobson et al. | 709/239 |
| 7,643,486 | B2 * | 1/2010 | Belz et al. | 370/392 |
| 2003/0103453 | A1 * | 6/2003 | Huang et al. | 370/229 |
| 2003/0112822 | A1 * | 6/2003 | Hong et al. | 370/469 |
| 2003/0219026 | A1 * | 11/2003 | Sun et al. | 370/412 |
| 2003/0231593 | A1 * | 12/2003 | Bauman et al. | 370/235 |
| 2004/0081091 | A1 * | 4/2004 | Widmer et al. | 370/230 |
| 2004/0109412 | A1 * | 6/2004 | Hansson et al. | 370/229 |
| 2004/0148482 | A1 * | 7/2004 | Grundy et al. | 711/167 |
| 2005/0128951 | A1 * | 6/2005 | Chawla et al. | 370/235 |
| 2005/0169172 | A1 * | 8/2005 | Wang et al. | 370/229 |
| 2005/0249128 | A1 | 11/2005 | Mekkittikul et al. | |
| 2006/0039374 | A1 * | 2/2006 | Belz et al. | 370/389 |
| 2006/0227788 | A1 | 10/2006 | Eldar et al. | |
| 2006/0242313 | A1 * | 10/2006 | Le et al. | 709/230 |
| 2006/0268704 | A1 | 11/2006 | Ansari et al. | |
| 2007/0053353 | A1 * | 3/2007 | Lee et al. | 370/389 |
| 2008/0189522 | A1 * | 8/2008 | Meil et al. | 712/220 |
| 2008/0212472 | A1 * | 9/2008 | Musacchio et al. | 370/232 |

(Continued)

OTHER PUBLICATIONS

Fredj, S. Ben, et al., "Statistical Bandwidth Sharing: A Study of Congestion at Flow Level", Aug. 2001, pp. 111-122.

(Continued)

Primary Examiner — Krista Zele
Assistant Examiner — Margishi Desai
(74) Attorney, Agent, or Firm — Workman Nydegger (57) ABSTRACT

The present invention extends to methods, systems, and computer program products for group based allocation of terminal server network bandwidth. Output packets are classified into groups based on classification criteria. Output packets for each group are queue into a corresponding queue. During a queue flush cycle each queue containing data is flushed for an essentially equal amount of time. Flushing each queue essentially equally reduces the negative impact that can otherwise result when a subset of sessions (or even a single session) request(s) a disproportional share of terminal server network bandwidth. Responsiveness can be further increased by distributing the essentially equal amount for each queue across the queue flush cycle.

9 Claims, 6 Drawing Sheets

U.S. PATENT DOCUMENTS

2009/0288129 A1* 11/2009 Wolfe et al. .................... 725/116
2009/0290533 A1* 11/2009 Connors et al. ............... 370/316
2009/0323707 A1* 12/2009 Aimoto ......................... 370/401

OTHER PUBLICATIONS

Kelly, F. P., et al., "Fluid Model for a Network Operating Under a Fair Bandwidth-Sharing Policy", Mar. 2003; Revised Jun. 2003 This is an electronic reprint of the original article published by the Institute of Mathematical Statistics in the Annals of Applied Probability, 2004, vol. 14, No. 3, 1055-1083. This reprint differs from the original in pagination and typographic detail, 31 pages.

Filali, Fethi, et al., "Fair Bandwidth Sharing Between Unicast and Multicast Flows in Best-Effort Networks", Computer Communications, vol. 27, Issue 4, Mar. 1, 2004, 21 pages.

Padmanabhan, Venkata N., "Coordinated Congestion Management and Bandwidth Sharing for Heterogeneous Data Streams", Proceedings of the 9th International Workshop on Network and Operating System Support for Digital Audio and Video (NOSSDAV), pp. 187-190, 1999.

* cited by examiner

GROUP BASED ALLOCATION OF NETWORK BANDWIDTH

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In many environments, a single computer user has multiple computing devices they use to perform computing tasks. For example, a corporate employee may have a work computer, a home computer, and a laptop. Each of these computer systems may be in and may move between different physical locations. For example, the work computer may be in a corporate building, the home computer may be in the employee's home, and the laptop may be in various different locations as the employee travels. However, the employee may desire uniform access to work related applications and work related data from any of their computer systems in any location.

Thus, it may be that all the applications installed at the work computer are also installed on the home computer and on the laptop. Installing the same applications on all of the employee's computer systems can provide a common look and feel across all the computer systems. Installing the same applications on all the employee's computer systems can also provide access to corporate applications and corporate data access in a uniform fashion across all of the computer systems. However, installing the same application on multiple computer systems also has a number of drawbacks.

A corporation supporting the applications may be required to have a license for each version of an application that is installed. Thus, if a computer user has three computer systems, the corporation is required, at least for some applications, to buy three licensed copies of the application. Additional license must be purchased even if some versions of an application (e.g., on a home computer) are used infrequently. Purchasing additional licenses increases the cost of providing employees with uniform access to corporate applications and corporate data.

Further, a corporation may have limited, if any, control over one or more of the employee's computer systems. For example, a corporation may have limited control over an employee's laptop (even if the laptop is corporate property), since the laptop may be used in various different physical locations (e.g., hotels, airports, etc.) at the discretion of the employee. A corporation may have essentially no control over an employee's home computer system, since the home computer system is in the employee's home. Thus, there is no way to insure that corporate security mechanisms (e.g., firewalls, SPAM filters, virus scanners, etc.) are used to protect one or more of an employee's computer systems, when those one or more computer systems access corporate applications and corporate data. Lack of access to corporate security mechanisms is problematic since a security breach to a non-corporate application or non-corporate data can be propagated corporate applications and data. For example, a virus received in a personal e-mail at a home computer system can be propagated to corporate data when the corporate data is subsequently accessed at the home computer system.

Due at last in part to these cost and security concerns, many corporations (as well as other entities) use terminal servers to provide remote access to applications and data. A terminal server maintains applications, data, and even entire desktops that can be accessed and executed remotely by client computer systems. Input is entered at a client computer system and transferred over a network (e.g., using protocols based on the ITU T.120 family of protocols, such as, for example, Remote Desktop Protocol ("RDP")) to an application at the terminal server. The application processes the input as if the input was entered at the terminal server. The application generates output in response to the received input and the output is transferred over the network (e.g., also T.120 based protocols) to the client computer system. The client computer system presents the output data. Thus, input is received and output presented at the client computer system, while processing actually occurs at the terminal server.

In most, if not all terminal server environments, multiple client computer systems concurrently maintain a session with a terminal server. Thus, at any given time, a terminal server can be providing application services, data, etc., to multiple client computer systems. Depending, on a terminal server's resources and client computer system operations, a terminal server can concurrently exchange some amount of data with a number of client computer systems in a reasonably responsive manner (e.g., 250 ms or less). However, the responsiveness of a terminal server eventually begins to degrade (even if configured with significant resources) when the number of concurrent client computer increase past a specified threshold. Further, even with fewer clients, responsiveness can degrade when client computer systems invoke resource intensive operations.

For example, a terminal server has a limited amount of available bandwidth (potentially aggregated across a number of network interfaces) for use in transferring data on behalf of client sessions. If a subset of (or even a single) client computer systems invokes data transfers consuming a significant portion of the available bandwidth, the responsiveness to other client computer systems is degraded. When responsiveness degrades to a certain extent (e.g., more than 250 ms), the user experience is negatively impacted. For example, user interactivity can appear to lag due to the delay between entering commands and receiving responses from the terminal server.

Some terminal servers cap the amount of bandwidth that can be allocated to client sessions. Capping bandwidth insures that the terminal server has adequate bandwidth for its own internal operations. However, bandwidth capping does little, if anything, to fairly allocate remaining bandwidth between clients session. Thus in most environments, when a subset of client sessions (or a single client session) invokes data transfers that consume significant portions of available bandwidth, the responsiveness of other client sessions tends to degrade.

BRIEF SUMMARY

The present invention extends to methods, systems, and computer program products for group based allocation of terminal server network bandwidth. In some embodiments, a terminal server formulates a plurality of corresponding output packets responsive to the one or more in packets received from each of a plurality of different client computer systems respectively. The terminal server classifies the output packets into a plurality of corresponding groups in accordance with classification criteria. The classification criteria indicate how to group packets so as to more evenly distribute bandwidth when sending output packets back to the plurality of different computer systems. The terminal server queues the classified output packets from each of the plurality of groups into a corresponding plurality of queues respectively.

In other embodiments, the terminal server determines the available bandwidth of the terminal server. The terminal server accesses a time period for a queue flushing cycle. The queue flushing cycle indicates how long data is to be flushed from the corresponding plurality of queues prior to re-determining the available bandwidth of the terminal server. The terminal server flushes at least a portion of each of the plurality of queues containing data during the queue flushing cycle to send output packets to the corresponding client computer systems. Accordingly, terminal server bandwidth is more evenly allocated among the plurality of different client computer systems.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for group based allocation of terminal server bandwidth. The present invention extends to methods, systems, and computer program products for group based allocation of network bandwidth. In some embodiments, a terminal server formulates a plurality of corresponding output packets responsive to the one or more in packets received from each of a plurality of different client computer systems respectively. The terminal server classifies the output packets into a plurality of corresponding groups in accordance with classification criteria. The classification criteria indicate how to group packets so as to more evenly distribute bandwidth when sending output packets back to the plurality of different computer systems. The terminal server queues the classified output packets from each of the plurality of groups into a corresponding plurality of queues respectively.

In other embodiments, the terminal server determines the available bandwidth of the terminal server. The terminal server accesses a time period for a queue flushing cycle. The queue flushing cycle indicates how long data is to be flushed from the corresponding plurality of queues prior to re-determining the available bandwidth of the terminal server. The terminal server flushes at least a portion of each of the plurality of queues containing data during the queue flushing cycle to send output packets to the corresponding client computer systems. Accordingly, terminal server bandwidth is more evenly allocated among the plurality of different client computer systems.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1A:
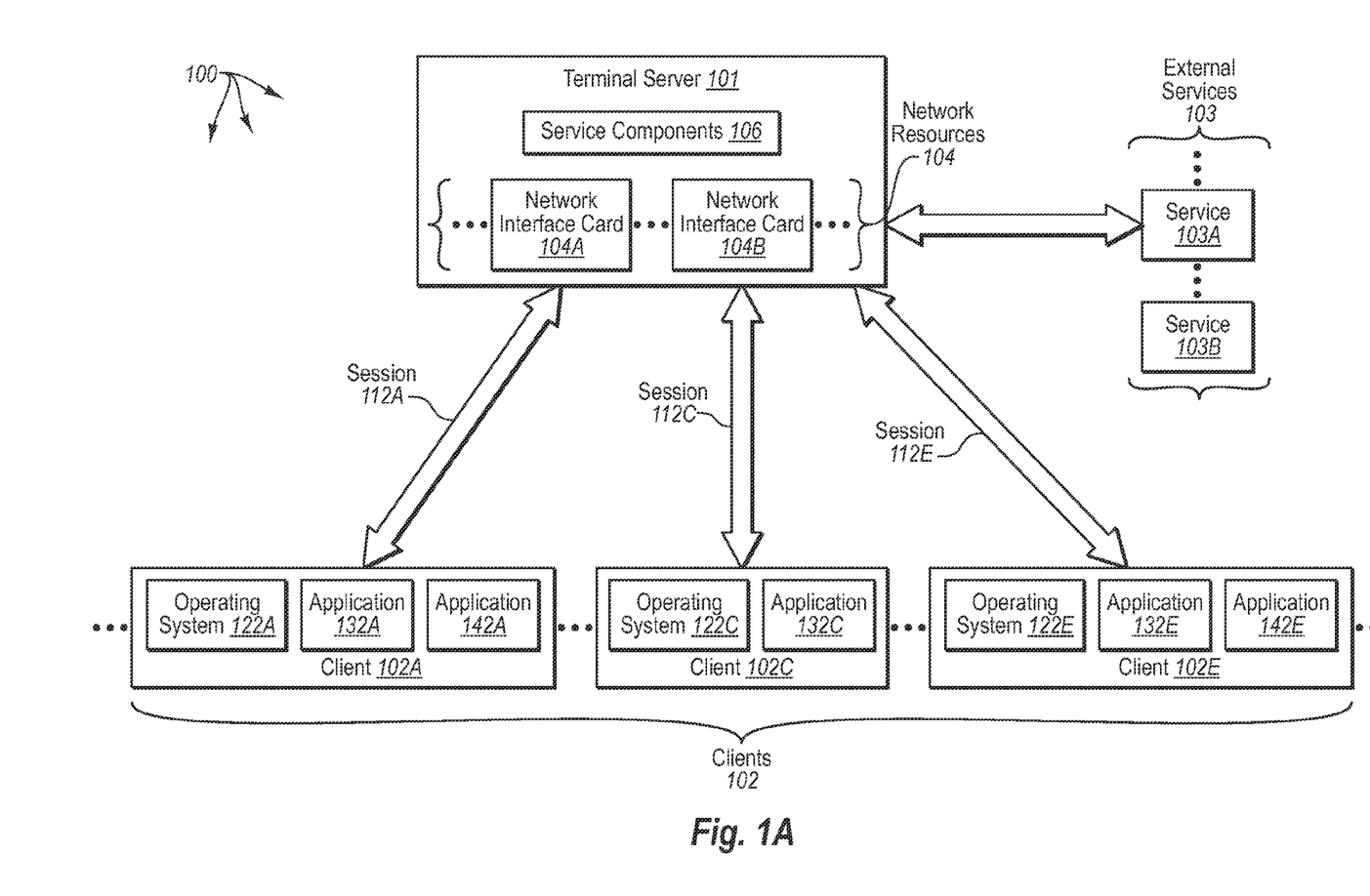
FIG. 1A illustrates an example computer architecture that facilitates group based allocation of terminal server network bandwidth.

FIG. 1A illustrates an example computer architecture 100 that facilitates grouped based allocation of terminal server network bandwidth. Referring to FIG. 1, computer architecture 100 includes terminal server 101, external services 103, and clients 102. Each of the depicted computer systems can be connected to one another over (or be part of) a network, such as, for example, a Local Area Network ("LAN"), a Wide Area Network ("WAN"), and even the Internet. Accordingly, each of the depicted components as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted in FIG. 1A, terminal server 101 includes service components 106. Services components 106 can include one or more software services, such as, for example, applications, operating system services, etc. Clients can exchange data with terminal server 101 to utilize the software services. Terminal server 101 also includes network resources 104. Network resources 104 can include hardware and software components, such as, for example, network interface cards 104A and 104B, that facilitate network communication with other computer systems, including clients 102 and external services 103.

Collectively, network services 104 provide some total aggregate amount of bandwidth spread across available network interface cards. From among the total amount of bandwidth, terminal server 101 can reserve some bandwidth (e.g., approximately 30%) for terminal server system operations. Any remaining bandwidth not reserved for terminal server system operations (e.g., approximately 70%) can be viewed as "available bandwidth". Terminal server 101 can utilize available bandwidth to communicate and exchange data with client computer systems and external services.

However, reserved bandwidth is also dynamic and can vary over time, increasing and decreasing, based on the need for performing terminal server system operations. For example, during (or even some time prior to) scheduled maintenance operations, terminal server 101 can reserve more bandwidth. On the other hand, between (or shortly after the completion of) scheduled maintenance operations terminal server 101 can reserve less bandwidth. Terminal server 101 can also vary reserved bandwidth based on other conditions at or related to terminal server 101

Accordingly, available bandwidth is also dynamic and can correspondingly also vary over time, decreasing and increasing. When terminal server 101 reserves less bandwidth, the available bandwidth is increased. On the other hand, when terminal server 101 reserves more bandwidth, the available bandwidth is reduced.

External services 103 represent a plurality of different services, including services 103A and 103B. External services 103 can include any number and type of services for use by terminal server 101, such as, for example, authentication services, content protection services, encryption services, digital signature services, etc.

Clients 102 include one more client computer systems including clients 102A, 102C, and 102E. Ellipsis represent that other client computer systems, such as, for example, clients 102B and 102D (not shown) can also be present before, between, and after the expressly depicted clients computer systems in computer architecture 100.

Each of clients 102 can include an operating and one or more active applications. For example, client 102A includes operating system 122A and applications, 132A, and 142A, client 102C includes operating system 122C and application 132C, and client 102E includes application 122E and applications 132E and 142E. Each of clients 102 can establish a session with terminal server 101 to access and utilize the resources of terminal server 101. For example, client 102A can establish session 112A, client 102C can establish session 102C, client 102E can establish session 113E, etc.

Figure 1B:
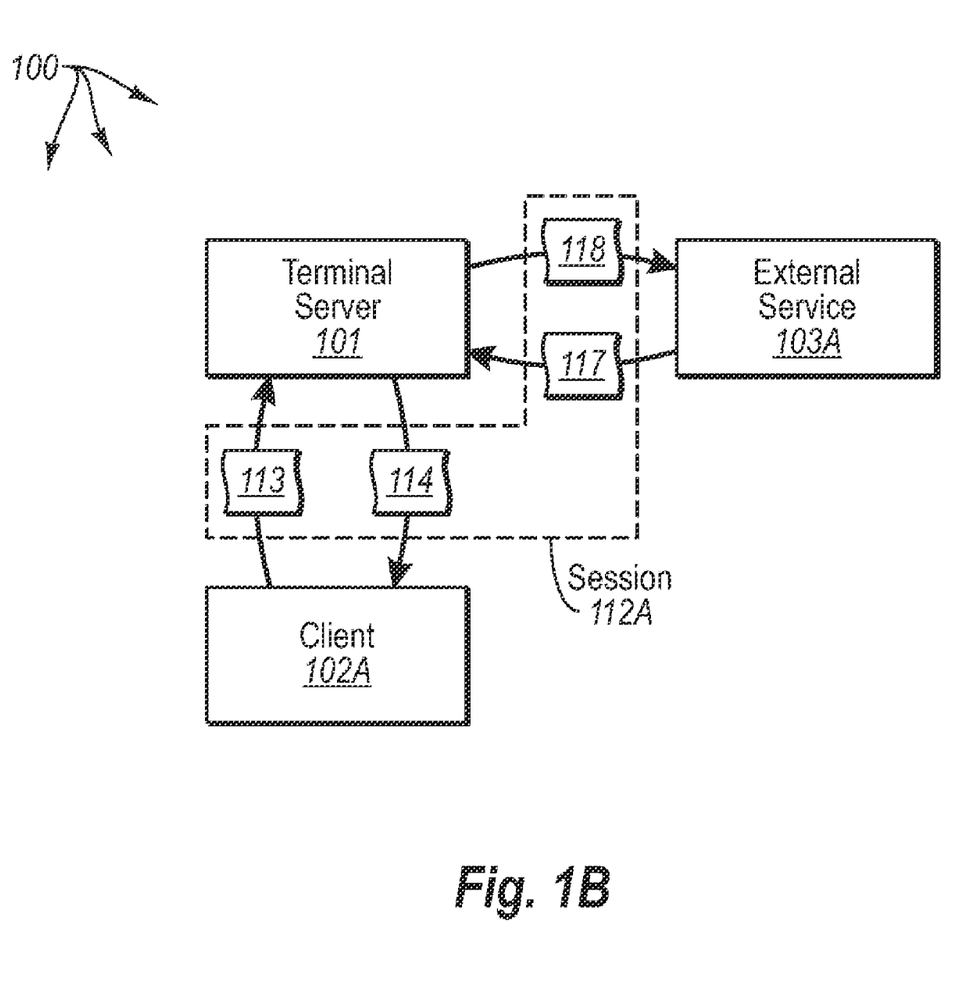
FIG. 1B illustrates an example of associating data with a terminal server session.

Data exchanged with terminal server 101 can be associated with a session so that terminal server 101 can identify the appropriate client to return data to. FIG. 1B illustrates an example of associating data with a terminal server session. For example, referring now to FIG. 1B, message 113 can be sent from client 102A to terminal server 101. Upon, receiving message 113, terminal server can maintain in indication that message 113 was received from session 112A. In response to message 113, terminal server can generate message 114. Terminal server 101 can refer to the indication of message 113 being received form session 112A to determine that message 114 is to be returned to session 102A. Based on that knowledge, terminal server can return message 114 to client 102A.

Terminal server 101 is also configured to track session association through communication with external services. For example, in response to message 113, terminal server can send message 116 to external service 103A. Terminal server 101 can maintain an indication that a response message to message 116 is to be associated with session 112A. In response to receiving message 116, external service 103A can send message 117 to terminal server 101. Upon receiving message 117, terminal server 101 is aware that message 117 is associated with session 112A through the maintained indication.

Thus, in some embodiments a session is collectively represented as including client related communication for and/or on behalf of a client, even when the client is not a direct a participant in the communication. For example, in FIG. 2A, session 112A is depicted to include communication between client 102A and terminal server 101 as well as communication between terminal server 101 and external service 103A initiated for and/or on behalf of client 102A. Accordingly, a "session" throughout the description and following claims is defined to include communication between a terminal server and external services for and/or on behalf of a client of the terminal server.

Figure 1C:
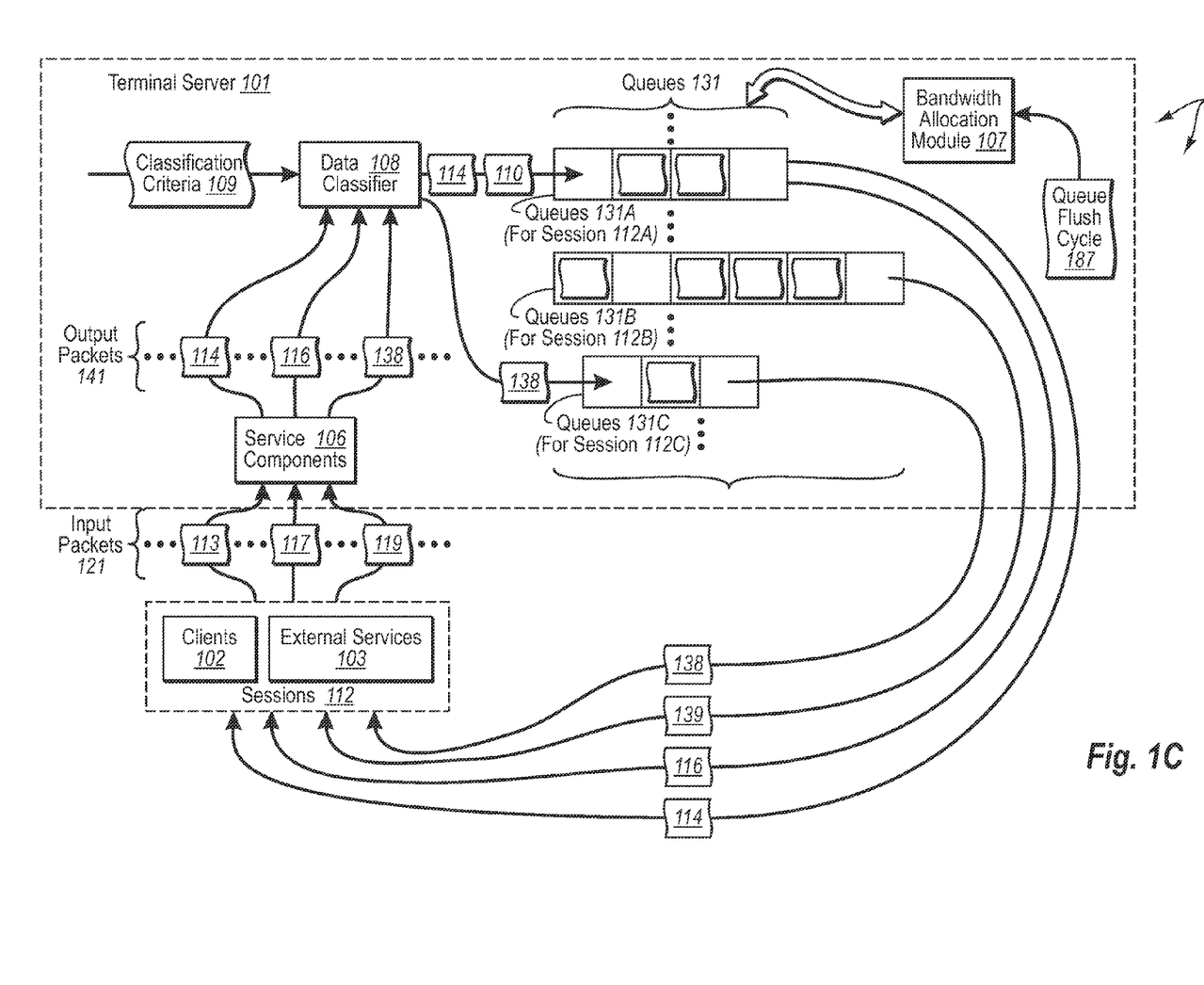
FIG. 1C illustrates an example more detailed computer architecture that facilitates group based allocation of terminal server network bandwidth

Referring now to FIG. 1C, FIG. 1C illustrates more detailed example of computer architecture 100 that facilitates group based allocation of terminal server network bandwidth. As depicted in FIG. 1C, sessions 112 are collectively represented as communication to and from clients 102 and external services 103. It should be understood that the number of clients having an established session with terminal server 101 is dynamic and can vary over time. Further, the services utilized by each established session are also dynamic and can vary overtime.

As a result of at least these two varying conditions, the bandwidth needed to collectively satisfy all client related operations and data transfers can also vary overtime, increasing and decreasing. Further, the bandwidth need to satisfy client related operations and data transfers for an individual client can also vary overtime, increasing and decreasing. Thus, from time to time, a subset of (or even a single) client can require a disproportionately large share of available bandwidth to satisfy its operations and data transfers.

Sessions 112 can generate input packets 121, such as, for example, 113, 117, and 119, that are sent to terminal server 101. In response to the input packets, service components 106 can generate corresponding output packets 139, such as, for example, 114, 116, and 138. Output packets responsive to an input packet, can be a single output packet, a plurality of output packets, a stream of output packets, etc. Thus, 114, 116, and 138 represent some subset of response output packets responsive to input packets 121.

Output packets 141 are transferred to data classifier 108. Based on classification criteria 109, data classifier 108 places output packets 141 into queues 131. Queues 131 include a plurality of different queues. The number of queues in queues 131 can correspond to the number of resulting classifications that are possible based on classification criteria 109. Classification criteria 109 can include any of a variety of different types of criteria, such as, for example, protocol type, application type, priority, user, group, etc., that can be associated with an output packet.

In some embodiments, classification criteria 109 groups packets by mapping packets to originating handle processes which are part of the same session. Thus, each queue in queues 131 can corresponds to a client session. For example, queue 131A is for session 112A, queue 131B is for session 112B, queue 131C is for session 113C, etc. As depicted, output packets 114 and 116 are classified for session 112A and are queued in queue 131A. Likewise, output packet 138 is classified for session 112C and is queued in queue 131C. It should be understood that the expressly depicted queues 131A, 131B, and 131AC, as well as queues for other sessions (not shown), can already contain previously classified packets at the time output packets 141 are classified and queued.

From time to time, bandwidth allocation module 107 can (re)calculate the available bandwidth at terminal server 101. Bandwidth allocation module 107 can take the difference of subtracting bandwidth reserved for terminal server system operations from the total aggregate amount of bandwidth spread across available network interface cards (104A, 104B, etc.) to calculate the available bandwidth at terminal server 101. In some embodiments, available bandwidth is (re)calculated based on a specified time period, such as, for example, a queue flush cycle. A specified period of time can be configured to flush more or less queue data between each (re) calculation of available bandwidth. A specified time period can vary between zero and 1 seconds. In some embodiments, the specified time period is between 50 ms and 250 ms. In some embodiments, the specified time period is approximately 150 ms.

Based on the available bandwidth, the number of queues containing data, and the specified time period, a portion of the specified time period can be allocated for flushing data from each queue that contains data. For example, bandwidth allocation module 107 can calculate a portion of queue flush cycle 187 (a specified time period) that is to be allocated to each of the queues in queues 131 that contain data (and thus to each session in sessions 112). Bandwidth allocation module 107 can base the calculation on the available bandwidth of terminal server 101, the number of queues in queues 131 containing data, and queue flush cycle 187. The portion queue flush cycle 187 allocated to each queue can be essentially equal. That is, if ten queues contain data and queue flush cycle 187 is 100 ms, 10 ms is allocated for flushing data from each queue.

Thus, over the course of some amount to time, classified packets queued in queues 131 are eventually flushed out to their corresponding session. However, depending on data already queued, packets queued together for different sessions may or my not be flushed in the same queue flush cycle. For example, output packet 116 can be flushed in the same queue flush cycle as output packet 139 (already queued in queue 131B) even if output packet 116 and output packet 138 were queued together. Subsequently, either in the same or different queue flush cycles output packet 114 and output packet 138 can be flushed.

Figure 2A:
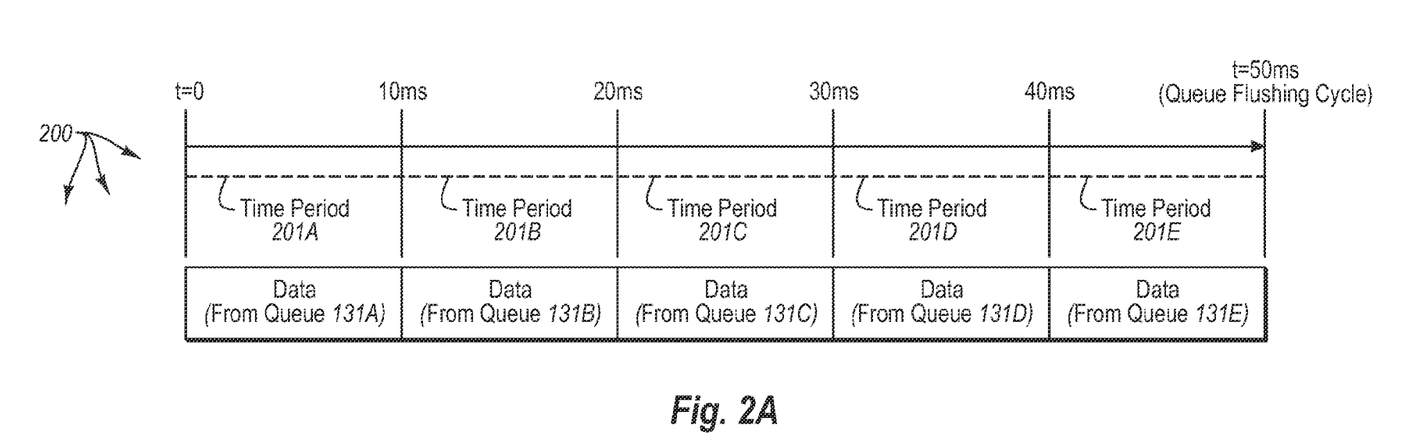
FIGS. 2A and 2B illustrate examples of timing diagrams for allocating terminal server network bandwidth during a queue flushing cycle.

In some embodiments, an allocated portion of a queue flush cycle for each queue is allocated as single block of time. FIG. 2A illustrates an example timing diagram 200 for allocating terminal server network bandwidth during a queue flushing cycle. As depicted in timing diagram 200, a queue flush cycle of 50 ms is allocated across five different queues. The five queues may be queues that contain data from among a larger plurality of queues. A queue time period (10 ms) can be calculated based on the number of queues that contain data (5) and the queue flush cycle (50 ms). The queue time period of the period of time allocated for flushing each queue during the queue flush cycle. For example, time period 201A (10 ms) is allocated for flushing data from queue 131A, time period 201B (10 ms) is allocated for flushing data from queue 131B, time period 201C (10 ms) is allocated for flushing data from queue 131C, time period 201D (10 ms) is allocated for flushing data from queue 131D, and time period 201E (10 ms) is allocated for flushing data from queue 131E.

Thus, each queue is allocated essentially an equal share of bandwidth within the queue flushing cycle. This reduces the negative impact that can otherwise result when a subset of sessions (or even a single session) request(s) a disproportional share of bandwidth. For example, a session that has requested a large multi-media file is allocated essentially the same amount of bandwidth as a session editing a document. In this example, the responsiveness of the document edits is not significantly impacted due to transfer of the large multi-media file since bandwidth allocation is equalized per session.

Figure 2B:
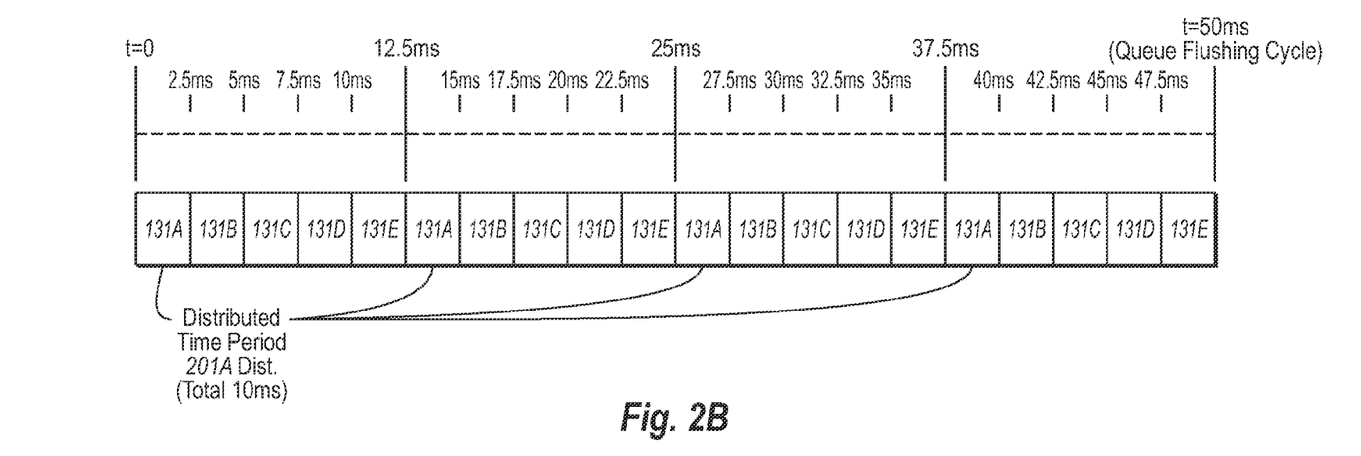

Responsiveness can be further increased by distributing allocated time periods across a queue flushing cycle. FIG. 2B illustrates an example timing diagram 250 for allocating terminal server network bandwidth during a queue flushing cycle. Similar to timing diagram 200, as depicted in timing diagram 250, a queue flush cycle of 50 ms is allocated across five different queues. The five queues may be queues that contain data from among a larger plurality of queues. Further, in timing diagram 250, the allocated time periods are distributed within the queue flushing cycle. Each queue is allocated 10 ms. The 10 ms for each queue is distributed as four different time periods of 2.5 ms within the queue flushing cycle. For example, distributed time period 201A distributed represents the time allocation for flushing data from queue 131A. Similar distributed time periods for flushing data from queues 131B, 131C, 131D, and 131E are also distributed within the queue flushing cycle.

Receiving a smaller amount of data at more frequent intervals can increase the perceived responsiveness at a client computer system. Thus, although a total of 10 ms is allocated to each queue, distributing the allocation in 2.5 ms increments can further increase perceived responsiveness at a client computer system. For example, in timing diagram 200 40 ms passes before any data is flushed from queue 131E. Further, between queue flushing cycles there is a delay equal to the queue flushing cycle. That is, based on a queue flushing cycle of 50 ms each of the queues is flushing data once every 50 ms in timing diagram 200.

On the other hand, in timing diagram 250 10 ms elapses before any data is flushed from queue 131E. Between queue flushing cycles the delay is also reduced. For example, if five queues contain data between consecutive queue flushing cycles each of the queues is flushing data once every 12.5 ms.

If the number of queues containing data increases, the delay increases but proportionally to the total number of queues containing data. For example, if ten queues contained data, each queue is allocated a time period of 5 ms. Depending on the distribution of the time periods, delay can vary but is still significantly lower than 50 ms between queue flush cycles which can still occur using timing diagram 200. For example, allocating 1 ms portions, each queue would have a 9 ms delay between queue flush cycles. Even allocating 2.5 ms portions, each queue would have a 22.5 ms delay between queue flush cycles.

Thus, allocating bandwidth as depicted in timing diagram 250 can further increase perceived responsiveness at a client computer system.

Figure 3:
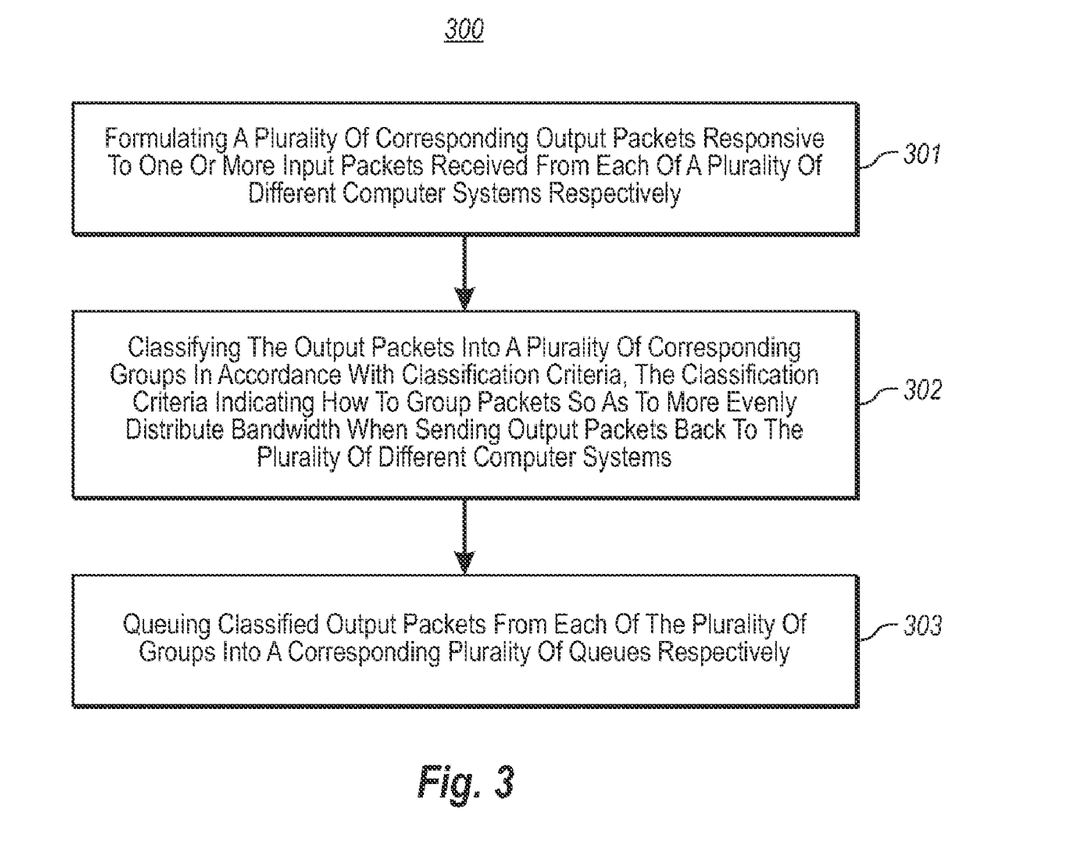
FIG. 3 illustrates a flow chart of an example method for classifying packets for use in allocating terminal server network bandwidth.

FIG. 3 illustrates a flow chart of an example method 300 for classifying packets for use in allocating network bandwidth. The method 300 will be described with respect to the components and data depicted in computer architecture 100.

Method 300 includes an act of formulating a plurality of corresponding output packets responsive to one or more input packets received from each of a plurality of different computer systems respectively (act 301). For example, referring to FIG. 3C, service components 106 can formulate output packets 141 responsive to input packets 121 from clients 102 and external services 103.

Method 300 includes an act of classifying the output packets into a plurality of corresponding groups in accordance with classification criteria, the classification criteria indication how to group packets so as to more evenly distribute bandwidth when sending output packets back to the plurality of different computer systems (act 302). For example, data classifier 108 can classify output packets 141 in accordance with classification criteria 109. Classification criteria 109 can indicate how output packets are to be grouped to more evenly distribute the network bandwidth of terminal server 101 (e.g., aggregated across network interface cards 104A, 104B, etc.) when sending output packets to clients 102 and external services 103. In some embodiments, output packets are grouped according to the session that is to receive the output packets. For example, if output packets 114 and 116 are to be received at session 112A, packets 114 and 116 are classified into the same group.

Method 300 includes an act of queuing classified output packets from each of the plurality of groups into a corresponding plurality of queues respectively (act 303). For example, data classifier 108 can queue classified output packets 141 into corresponding queues from among queues 131 based on grouping. In some embodiments, each queue in queues 131 corresponds to a session. Output packets are queued into an appropriate queue based on the session that is to receive the output packets. For example, if output packets 114 and 116 are to be received at session 112A, packets 114 and 116 are queued into queue 131A.

Figure 4:
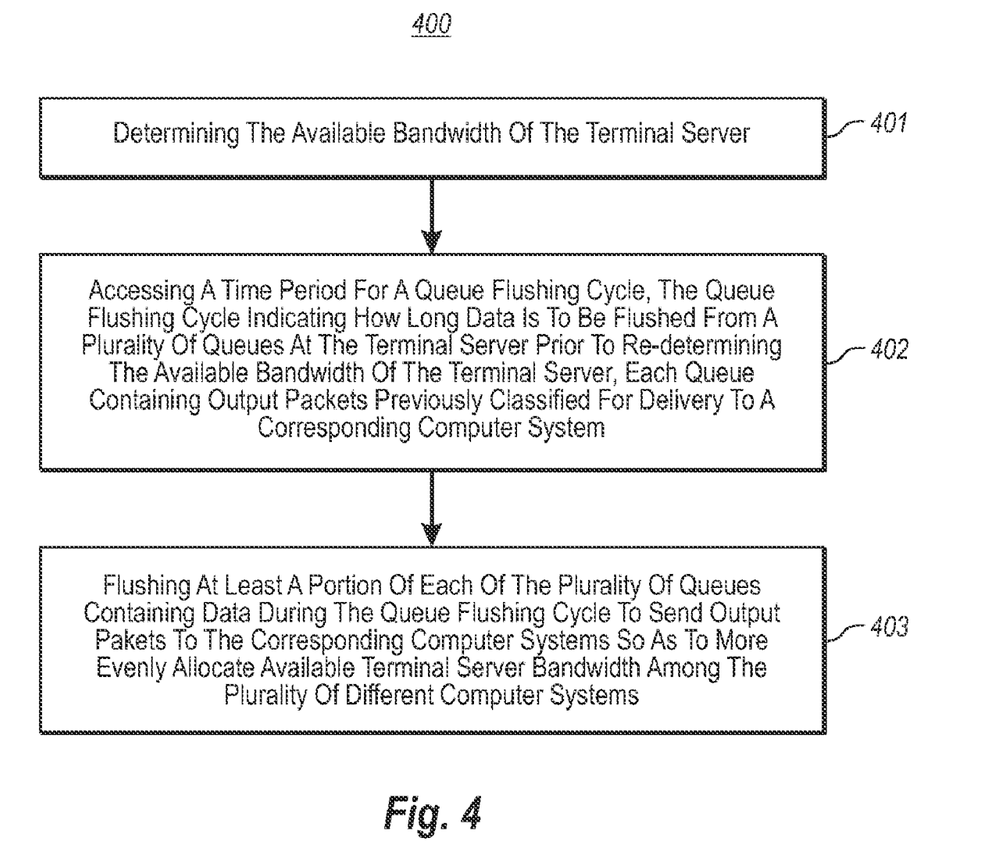
FIG. 4 illustrates a flow chart of an example method for allocating terminal server network bandwidth to a plurality of sessions.

During a queue flush cycle, data can be flushed from queues. FIG. 4 illustrates a flow chart of an example method 400 for allocating network bandwidth to a plurality of client computer systems. The method 400 will be described with respect to the components and data depicted in computer architecture 100.

Method 400 includes an act of determining the available bandwidth of the terminal server (act 401). For example, bandwidth allocation module 107 can determine the available bandwidth of terminal server 101.

Method 400 includes an act of accessing a time period for a queue flushing cycle, the queue flushing cycle indicating how long data is to be flushed from a plurality of queues at the terminal server prior to re-determining the available bandwidth of the terminal server, each queue containing data previously classified for delivery to a corresponding client computer system (act 402). For example, bandwidth allocation module 108 can access queue flushing cycle 187. Queue flushing cycle 187 indicates how long data is to be flushed from queues 131 before re-determining the available bandwidth of terminal server 101.

Method 400 includes an act of flushing at least a portion of each of the plurality of queues containing data during the queue flushing cycle to send data to the corresponding client computer systems so as to more evenly allocate available terminal server bandwidth among the plurality of different client computer systems (act 403). For example, terminal server 101 can flush at least a portion of each queue in queues 131 that contains data to the corresponding session during queue flush cycle 187. Data from queue 131A can be flushed to session 112A, data from queue 131B can be flushed to session 112B, etc. Flushing at least a portion of each queue that contains data more evenly allocates the available bandwidth of terminal server 101 among sessions 112.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a terminal server computer system, a method for allocating network bandwidth to servicing a plurality of different clients, including one or more client computer systems and/or external services interacting with the terminal server computer system in a plurality of corresponding terminal server sessions, the method comprising:
   an act of calculating available bandwidth of the terminal server to satisfy client related operations and data transfers;
   an act of identifying a specified time period to wait prior to recalculating the available bandwidth of the terminal server to satisfy the client related operations and data transfers, the specified time period comprising a queue flushing cycle, the queue flushing cycle indicating a duration of time to spend flushing data from a plurality of queues at the terminal server prior to the recalculation of the available bandwidth of the terminal server;
   an act of calculating and allocating queue time periods from the queue flushing cycle to each of the plurality of queues which are utilized for flushing at least a portion of each of the corresponding plurality of queues containing data during the queue flushing cycle to one or more corresponding clients so as to more evenly allocate available terminal server bandwidth among the plurality of different client terminal server sessions, wherein said calculating the queue time periods is based on the number of queues that contain data and the queue flushing cycle, each of the queue time periods indicating how long each corresponding queue containing data is to be flushed during the queue flush cycle;
   an act of recalculating available bandwidth of the terminal server to satisfy client related operations and data transfers; and
   an act of recalculating and reallocating the queue time periods from the queue flushing cycle to each of the plurality of queues which are utilized for flushing the at least said portion of each of the corresponding plurality of queues containing data during the queue flushing cycle to the one or more corresponding clients.

2. The method as recited in claim 1, wherein each output packet is formulated based on one or more input packets received from one of the plurality of clients.

3. The method as recited in claim 1, wherein the act of determining the available bandwidth of the terminal server comprises an act of subtracting bandwidth reserved for terminal server system operations from the total aggregate bandwidth of the terminal server.

4. The method as recited in claim 1, wherein each of the queue time periods is the same, such that the act of flushing at least a portion of each of the plurality of queues containing data during the queue flushing cycle comprises an act of flushing each queue containing data for the same queue time period.

5. The method as recited in claim 4, wherein the act of flushing each queue containing data for the queue time period comprises an act of distributing the queue time period for each queue containing data across the queue flushing cycle.

6. The method as recited in claim 1, wherein the act of flushing at least a portion of each of the plurality of queues containing data during the queue flushing cycle comprises an act of flushing output packets from each queue to the corresponding client.

7. The method as recited in claim 6, wherein the act of flushing at least a portion of each of the plurality of queues containing data during the queue flushing cycle comprises an act of flushing output packets from each queue to an external service performing operations on behalf of the corresponding client.

8. The method of claim 1 further comprising:
   an act of receiving one or more input packets from each of the plurality of different computer systems, each of the one or more input packets corresponding to a terminal server session with the terminal server;
   an act of formulating a plurality of corresponding output packets responsive to the one or more input packets from each of the plurality of different computer systems respectively;
   an act of classifying the output packets into a plurality of corresponding groups based on classification criteria, the classification criteria indicating that output packets are to be grouped per terminal server session so as to more evenly distribute bandwidth across the terminal server sessions when sending output packets back to the plurality of different computer systems, wherein the output packets are grouped by mapping the output packets to the originating handle processes which are part of the same terminal server session; and
   an act of queuing classified output packets from each of the plurality of groups into the plurality of queues respectively, each queue corresponding to a different terminal server session.

9. At a terminal server computer system, a method for allocating network bandwidth to a plurality of different computer systems including client computer systems and external services interacting with the terminal server computer system, the method comprising:
   an act of determining the available bandwidth of the terminal server;
   an act of accessing a time period for a queue flushing cycle, the queue flushing cycle indicating how long data is to be flushed from a plurality of queues at the terminal server prior to re-determining the available bandwidth of the terminal server, wherein each queue corresponds to a client terminal server session between a client and the terminal server such that each queue contains output packets that were previously classified for delivery to the client corresponding to the queue, the output packets beings classified by mapping the output packets to the originating handle processes which are part of the same client terminal server session;
   an act of determining a queue time period based on the number of queues that contain data and the queue flushing cycle, the queue time period indicating how long each queue containing data is to be flushed during the queue flush cycle;
   an act of flushing at least a portion of each of the plurality of queues containing data during the queue flushing cycle, for the queue time period, to send output packets to the corresponding client so as to more evenly allocate available terminal server bandwidth among the plurality of different client terminal server sessions; and
   an act of re-determining the available bandwidth of the terminal server.

* * * * *